US010006362B2

(12) United States Patent
Chen

(10) Patent No.: US 10,006,362 B2
(45) Date of Patent: Jun. 26, 2018

(54) VAPOR CRACKING CATALYST, PREPARATION METHOD THEREOF, AND COMBUSTION METHOD OF HYDROGEN OBTAINED BY VAPOR CRACKING

(71) Applicant: Huaichao Chen, Chongqing (CN)

(72) Inventor: Huaichao Chen, Chongqing (CN)

( * ) Notice: Subject to any disclaimer, the term of this patent is extended or adjusted under 35 U.S.C. 154(b) by 416 days.

(21) Appl. No.: 14/431,671

(22) PCT Filed: Sep. 22, 2013

(86) PCT No.: PCT/CN2013/083906
§ 371 (c)(1),
(2) Date: Mar. 26, 2015

(87) PCT Pub. No.: WO2014/048279
PCT Pub. Date: Apr. 3, 2014

(65) Prior Publication Data
US 2015/0275754 A1    Oct. 1, 2015

(30) Foreign Application Priority Data

Sep. 27, 2012 (CN) .......................... 2012 1 0364826

(51) Int. Cl.
*F02C 3/22*        (2006.01)
*C01B 3/04*        (2006.01)
(Continued)

(52) U.S. Cl.
CPC ............. *F02C 3/22* (2013.01); *B01J 27/0515* (2013.01); *B01J 37/0009* (2013.01); *B01J 37/04* (2013.01);
(Continued)

(58) Field of Classification Search
CPC ...... F02C 3/22; B01J 27/0515; B01J 37/0009; B01J 37/04; B01J 23/00; B01J 37/00;
(Continued)

(56) References Cited

U.S. PATENT DOCUMENTS 1,401,927 A * 12/1921 Sargent .................. C22B 34/34
75/623
2,462,499 A *  2/1949 Hoak ...................... B32B 27/00
423/147
(Continued)

FOREIGN PATENT DOCUMENTS

CN         102020243 A    4/2011
WO    WO-2014/048279 A1  4/2014

OTHER PUBLICATIONS

"International Application Serial No. PCT/CN2013/083906, International Search Report dated Jan. 16, 2014", (w/ English Translation), 6 pgs.
(Continued)

Primary Examiner — Phutthiwat Wongwian
Assistant Examiner — Loren Edwards
(74) Attorney, Agent, or Firm — Schwegman Lundberg & Woessner, P.A.

(57)            ABSTRACT

The invention provides a vapor cracking catalyst, an application of the vapor cracking catalyst, and a preparation method of the vapor cracking catalyst. In addition, the invention also provides a direct combustion method of a hydrogen gas obtained by vapor cracking. A plenty of cheap raw materials are adopted to prepare the catalyst provided by the invention and it leads to lower cost for production. In addition, the catalyst provided by the invention is capable of controlling the vapor cracking speed steadily so that the hydrogen gas is produced steadily and occurrence of explosion accidents is avoided effectively. The direct combustion method of a hydrogen gas obtained by vapor cracking provided by the invention truly achieves for the first time the fancy of producing hydrogen energy by water.

18 Claims, 1 Drawing Sheet

(51) Int. Cl.
    *C01B 13/02* (2006.01)
    *C01B 3/08* (2006.01)
    *B01J 27/051* (2006.01)
    *B01J 37/00* (2006.01)
    *B01J 37/04* (2006.01)
(52) U.S. Cl.
    CPC .................. *C01B 3/04* (2013.01); *C01B 3/08* (2013.01); *C01B 13/02* (2013.01); *Y02E 60/364* (2013.01)
(58) Field of Classification Search
    CPC .. C01B 3/04; C01B 3/08; C01B 13/02; Y02E 60/364
    USPC .......... 60/780; 502/325, 326, 327, 328, 329, 502/330, 331, 332, 333, 334, 335, 336, 502/337, 338, 339, 340, 341, 342, 343, 502/344, 345, 346, 347, 348, 349, 350, 502/351, 352, 353, 354, 355
    See application file for complete search history.

(56) References Cited

U.S. PATENT DOCUMENTS

| | | | | |
|---|---|---|---|---|
| 3,617,497 A * | 11/1971 | Bryson | ................ | C10G 11/18 208/120.01 |
| 3,661,555 A * | 5/1972 | Kusama | ................ | C22B 1/14 75/312 |
| 4,640,221 A * | 2/1987 | Barbee | ................ | C23C 16/4485 118/50 |
| 4,917,835 A * | 4/1990 | Lear | ................ | C04B 35/52 264/126 |
| 5,135,903 A * | 8/1992 | Birkenstock | ................ | B01J 25/02 502/301 |
| 5,715,673 A * | 2/1998 | Beichel | ................ | F01K 21/047 431/158 |
| 5,763,352 A * | 6/1998 | Jung | ................ | B01D 53/944 502/305 |
| 8,375,725 B2 * | 2/2013 | Keller | ................ | B01J 8/067 48/127.9 |
| 8,557,729 B2 * | 10/2013 | Cairns | ................ | B01J 23/755 264/15 |
| 2008/0152584 A1 * | 6/2008 | Anand | ................ | C01B 3/08 423/657 |
| 2010/0184592 A1 | 7/2010 | Sepeur et al. | | |

OTHER PUBLICATIONS

Hocking, Rosalie K., et al., "Water-oxidation catalysis by manganese in a geochemical-like cycle", *Nature Chemistry*, 3(6), (2011), 461-466.

Karunadasa, Hemamala I., et al., "A Molecular $MoS_2$ Edge Site Mimic for Catalytic Hydrogen Generation", *Science*, 335(6069), (2012), 698-702.

* cited by examiner

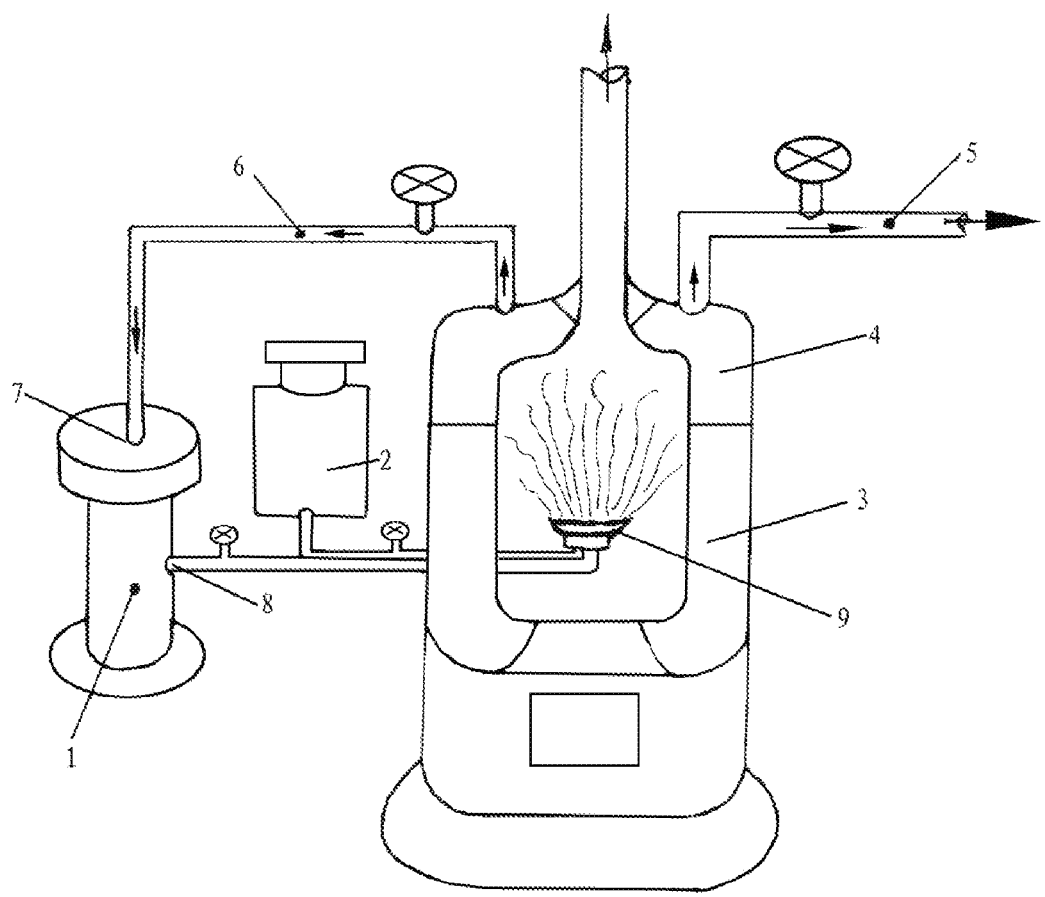

VAPOR CRACKING CATALYST, PREPARATION METHOD THEREOF, AND COMBUSTION METHOD OF HYDROGEN OBTAINED BY VAPOR CRACKING

PRIORITY APPLICATIONS

This application is a U.S. National Stage Filing under 35 U.S.C. 371 from International Application No. PCT/CN2013/083906, filed on 22 Sep. 2013, and published as WO 2014/048279 A1 on 3 Apr. 2014, which claims priority to Chinese Application No. 201210364826.7, filed 27 Sep. 2012; which applications and publication are incorporated herein by reference in their entirety.

TECHNICAL FIELD

The invention relates to a vapor cracking catalyst, an application thereof, a preparation method thereof, and a direct combustion method of a hydrogen gas obtained by vapor cracking.

TECHNICAL BACKGROUND

Energy is the most important element in the human economic activities. The energy is a natural resource and comes from radiation from the sun. Coal, petroleum and natural gas are solar energy stored in living beings in ancient times, and they are mainly hydrocarbons. Water and air may produce huge potential energy and kinetic energy under the action of the solar energy, and electric power converted from such potential energy and kinetic energy can become power for all machines. Water and wind can be directly converted into electric power, and such conversion will not produce environmental pollutants. The combustion of coal, petroleum and natural gas releases huge heat to thereby produce power. However, the combustion process produces a large number of environmental pollutants, e.g., carbon monoxide, carbon dioxide, sulfur dioxide, nitrogen oxide, carbon black particles, etc., and these environmental pollutants destroy the living environment of the human beings and endanger the human health. Further, since these energies are nonrenewable, along with the increase of the energy consumption day by day, and the decrease of the energy day by day, these energies will be exhausted one day. Thus, in the context that the problems of energy and environment are increasingly prominent, close attention is paid all over the world to seeking of clean and renewable new energy to replace the traditional fossil energy.

In the research on various new energies, hydrogen gas becomes the first choice of the researcher with its completely clean combustion manner and advantage of renewability. The hydrogen gas, as an ideal new energy, holds the following characteristics:

1. The heat release rate of hydrogen gas is high. Concretely, 140,000 joules of heat can be released by means of combustion of a gram of hydrogen gas, which is equivalent to approximately three times of the heat released by means of combustion of a gram of gasoline, and also the hydrogen gas can be recycled.

2. Water is the main raw material used for making hydrogen gas, and there are two hydrogen atoms in just one molecule of water; and water covers 71% of the earth surface and the resource is very rich.

3. In the combustion process of the hydrogen gas, in addition to huge energy released, the product of the combustion is only water, with no pollution emission and the combustion process will not cause environmental pollution, so the hydrogen gas is also called "clean energy".

4. The hydrogen gas is light in weight, small in density, convenient in transport and carriage, and easy in storage, which has a more remarkable advantage over electricity that is difficult to be stored.

5. The use of the hydrogen gas is extremely broad. Specifically, the hydrogen gas is not only capable of producing heat energy by combustion process, but also producing various hydrogen-containing compounds, and further serve as the working medium for absorbing heat and the like.

Although the hydrogen energy takes so many advantages as mentioned above, at present, the development of hydrogen energy is restricted due to the expensive cost for producing the hydrogen gas. The traditional preparation methods of hydrogen include preparation of hydrogen by electrolyzing water and preparation of hydrogen by a high pressure or a high temperature, which need to consume a large amount of electric energy and coal or natural gas. The consumed energy is more than the energy produced by means of the combustion of the fuel. Such expensive cost makes the hydrogen energy be only adapted to special uses, e.g., promoting the space rocket or maintaining the fuel cell in the spacecraft. Thus, it has not been truly achieved yet although many researchers put forward the fancy of producing hydrogen energy by water for many years.

SUMMARY

In order to overcome the defect that hydrogen energy in water cannot be cheaply utilized in prior arts, the invention provides a cheap catalyst for cracking vapor and a cheap direct combustion method of a hydrogen gas obtained by vapor cracking.

One aspect of the invention provides a vapor cracking catalyst, characterized in that the catalyst comprises the following elements: iron, aluminum, molybdenum, platinum, manganese and at least one alkali-metal; wherein said iron and said aluminum are their respective simple substances, and said molybdenum, said platinum, said manganese and said at least one alkali-metal are their respective simple substances or compounds, respectively.

Another aspect of the invention provides an application of the vapor cracking catalyst in catalytic cracking of water to produce a hydrogen gas.

A further aspect of the invention provides a preparation method of said vapor cracking catalyst, characterized in that said method comprises smashing said respective components of said catalyst into fines; homogenizing said respective components by using an adhesive not interacting with said respective components of said vapor cracking catalyst; and then performing molding under a certain pressure.

A still further aspect of the invention provides a direct combustion method of a hydrogen gas obtained by vapor cracking, characterized in that the method comprises, introducing vapor from an inlet of a pressure container containing the vapor cracking catalyst; extracting a mixed gas containing a hydrogen gas and an oxygen gas obtained by cracking from an outlet of said pressure container, and, respectively introducing said mixed gas and an amount of an ignition agent to a combustion place or respectively introducing said mixed gas and laser to said combustion place to ignite.

The catalysts for cracking water provided in the prior arts are always noble metals, e.g., platinum, with exorbitant cost. The catalyst provided in the invention is prepared by adopting a plenty of cheap raw materials with lower-paid cost. In addition, the catalyst provided in the invention is capable of controlling the speed of vapor cracking steadily so that the hydrogen gas can be produced steadily and occurrence of explosion accidents is avoided effectively.

Besides, it is well known that an explosion will occur when a mixture having a content of 4-75% of a hydrogen gas undergoes combustion in the air, and the content of the hydrogen gas decomposed from water in the mixed gas is around 67%, which just falls within the range of the combustion and explosion. Thus the technique of performing direct combustion of the hydrogen gas decomposed from water cannot be achieved at present, in the art. However, the inventor of the invention accidentally finds when the vapor is introduced into a flame source to undergo combustion together with the mixed gas of the hydrogen gas and the oxygen gas, the combustion can be performed calmly and steadily, and a large amount of energy is provided. Therefore, the direct combustion method of a hydrogen gas obtained by vapor cracking provided in the invention truly achieves for the first time the fancy of producing hydrogen energy by water.

DESCRIPTION OF THE DRAWING

FIG. 1 is a schematic diagram of the direct combustion method of a hydrogen gas obtained by vapor cracking of the invention.

DETAILED DESCRIPTION OF THE INVENTION

The invention provides a vapor cracking catalyst which comprises the following elements: iron, aluminum, molybdenum, platinum, manganese and one or more alkali-metals; wherein the iron and the aluminum are their respective simple substances, and the molybdenum, the platinum, the manganese and the alkali-metal are their respective simple substances or compounds, respectively.

According to the research results of the inventor of the invention, all the elements in the alkali-metal group, e.g., lithium, sodium, potassium, rubidium, and cesium, can achieve the object of the invention. In order to facilitate industrial operations, it is preferable to use element of sodium.

Although both the simple substances and compounds of the molybdenum, platinum, manganese and alkali-metal can achieve the object of the invention, by a plenty of experiments the inventor of the invention reaches that the catalyst prepared by the compounds of some of the elements achieves a favorable effect, and the catalyst prepared by their single substances of other elements achieves a favorable effect however.

In a preferred embodiment, the platinum is a simple substance, the compound of the alkali-metal can be sodium salt, the compound of the molybdenum can be molybdenum ore, preferably molybdenite, and more preferably refined molybdenite, and the compound of the manganese is manganese ore, preferably refined manganese ore.

The catalyst prepared by adopting the above components can effectively catalyze the cracking of the vapor into the hydrogen gas and the oxygen gas. In order to further improve the catalyzing effect, in a preferred embodiment, said sodium salt is one or more of sodium chloride, sodium sulfate and sodium nitrate, but more preferably sodium chloride; wherein based by the total weight of the vapor cracking catalyst, the iron is 1-15 wt. %, the aluminum is 10-40 wt. %, the platinum single substance is 1-20 wt. %, the sodium chloride is 1-15 wt. %, the molybdenite is 10-30 wt. %, and the manganese ore is 10-50 wt. %. In another preferred embodiment, the iron is 3-10 wt. %, the aluminum is 15-30 wt. %, the platinum single substance is 1-10 wt. %, the sodium chloride is 1-10 wt. %, the molybdenite is 10-20 wt. %, and the manganese ore is 10-40 wt. %. The catalyst prepared by this formulation not only has a further reduced cost, but also achieves a more desired catalyzing effect.

The vapor cracking catalyst can be prepared into various forms of the existing catalyst according to actual requirements, e.g., the catalyst can be powdered, porously granular, porously massive or one loaded on other carriers. However, in a preferred embodiment, the vapor cracking catalyst is prepared with porously granular or porously massive shape, and most preferably porously massive shape.

The invention also provides a preparation method of the vapor cracking catalyst, which can be done just by, for example, smashing the respective components into fines, and uniformly mixing the respective components. In order to prepare the porously granular or porously massive catalyst, in addition to smashing the respective components into fines and uniformly mixing them, the method further comprises homogenizing the respective components by using an adhesive, and then making the respective components into different porous shapes in different molds. Please pay more attention that it needs to select the adhesive which is not capable of being interacted with the respective components of the catalyst.

Thus, in a preferred embodiment, the preparation method of the vapor cracking catalyst comprises smashing the respective components of the catalyst into fines, homogenizing the respective components by using an adhesive which does not interact with the respective components of the vapor cracking catalyst, and then performing molding under a certain pressure.

The adhesive not interacting with the respective components of the catalyst can be various known adhesives which do not interact with water, preferably one or more of water glass, glutinous rice paste and paste, and water glass optimizedly. In order to obtain certain porosity in the molded vapor cracking catalyst, the pressure can be 2-8 atmospheres, preferably 3-7 atmospheres, and more preferably 4-6 atmospheres.

With the respective components disclosed in the invention, it spends much lower expenses obtaining the vapor cracking catalyst and what's more the preparation process is very simple. Therefore it is very compatible for the industrial applications in the world, particularly in those scarce-energy countries.

The vapor cracking catalyst of the invention is not only capable of effectively cracking the vapor but also catalyzing the cracking of water to produce the hydrogen gas. For example, the vapor cracking catalyst of the invention can make warm water slowly release the hydrogen gas and make hot water quickly release the hydrogen gas. For example, it makes water with temperature of 60-80° C. release the hydrogen gas very fast.

The vapor cracking catalyst of the invention is capable of producing the hydrogen gas when cracking the vapor in a controllable and steadily manner. Thus, the invention also discloses a direct combustion method of a hydrogen gas obtained by vapor cracking. The method comprises introducing vapor from an inlet of a pressure container containing the vapor cracking catalyst, extracting a mixed gas containing a hydrogen gas and an oxygen gas obtained by cracking from an outlet of the pressure container, and respectively introducing the mixed gas and an amount of an ignition agent to a combustion place or respectively introducing the mixed gas and laser to the combustion place to ignite.

The use amount of the ignition agent is determined by actual requirements.

The vapor cracking catalyst is available in powdered, porously granular or porously massive form. When the vapor cracking catalyst is powered or granular, the pressure container should be equipped with a loading device. The wall of the loading device is provided with bores, and the diameters of the bores are smaller than the diameters of the powders or granules. When the vapor cracking catalyst is massive, the pressure container only needs to have a shelf on which the massive substances can be placed. Therefore, in order to facilitate the operation, the vapor cracking catalyst is preferably massive formed, e.g., the catalysts required for one day can be placed in the pressure container all at one time.

The combustion place can be various positions to be heated, e.g., when heating a boiler to produce vapor, the combustion place just refers to the hearth of the boiler. The boiler can be the existing boiler or a boiler having a simpler structure that is dedicatedly designed for the combustion of the hydrogen gas.

When the vapor exists in the mixed gas, safe combustion can be performed only by a sparing amount of the ignition agent. Thus, in a preferred embodiment, the mixed gas is capable of containing the vapor that is not cracked.

In order to obtain more hydrogen gases before ignition, in a preferred embodiment, the outlet is closed before the vapor is introduced into the pressure container; the inlet is closed when the pressure in the pressure container reaches a first set pressure; the outlet is then opened when the pressure in the pressure container reaches a second set pressure; and an ignition is performed at the combustion place, and the inlet is subsequently opened.

The first set pressure and the second set pressure can be set according to the pressure condition of the pressure container and/or according to the temperature of the flame during the combustion.

In a preferred embodiment, the first set pressure is 1-4 atmospheres, and preferably 2.5-4 atmospheres, and the second set pressure is 3-8 atmospheres, and preferably 5-6 atmospheres.

In another preferred embodiment, the first set pressure is 2.5-4 atmospheres, and the second set pressure is 5-6 atmospheres.

In order to prevent the pressure of the pressure container from being increased too much, in a preferred embodiment, the diameter of the inlet is less than the diameter of the outlet so as to facilitate the release of the pressure in the pressure container.

The ignition agent and the laser both provide open fires for the combustion of the hydrogen gas.

The ignition agent can be the existing gaseous or liquid state ignition agent, e.g., it can be selected from alcohol, natural gas, gasoline or diesel oil, preferably alcohol.

When the ignition agent is liquid, in order to prevent the nozzle from being blocked by the liquid, a pipeline for draining the ignition agent and/or a pipeline for draining the mixed gas is equipped with a sheath for accommodating a cooling medium. The cooling medium can be various cooling media in the prior arts, but by taking the cost into consideration, the cooling medium is preferably water.

The use amount of the catalyst can be set according to the desired vapor cracking speed, and in order to control that the vapor cracking has a proper speed (i.e., enabling the hydrogen gas produced by vapor cracking to undergo steady combustion, and not undergo a risk of occurrence of explosions), the use amount of the catalyst is defined as 0.3-2.5 kilograms per hour per ton of vapor to be cracked, preferably 0.5-2 kilograms per hour per ton of vapor to be cracked, and most preferably 0.8-1.5 kilograms per hour per ton of vapor to be cracked.

In an embodiment, the direct combustion of the hydrogen gas is used for producing vapor, and the vapor to be cracked is a part of the produced vapor, and such embodiment of the vapor self-circulating to serve as a fuel can further reduce the implementing of other auxiliary devices. When the vapor is continuously provided outwards, and when the catalyst needs to be increased, the inlet and the outlet of the pressure container can be closed for the moment, and then the catalyst is directly added, which requires very short time of around a few minutes. Certainly, it is preferred that a manifold valve can be provided at the inlet and outlet places and two pressure containers are further equipped, so as to achieve providing the hydrogen gas obtained by vapor cracking almost without intervals.

The amount of the vapor to be cracked can be set according to the desired flame temperature and the capacity of the boiler for producing the vapor. For example, the vapor to be cracked is 1-10 wt. % of the produced vapor. With respect to a boiler of 4 tons (i.e., 4 tons of vapor per hour, hereinafter the boiler of 4 tons referring to the same meaning), when the vapor to be cracked is generally 3-8 wt. % of the produced vapor, and preferably 4-6 wt. % of the produced vapor, the obtained flame temperature generally can reach 1000° C. or above.

When the ignition agent is alcohol, the use amount of the alcohol can be 4-12 kilograms per hour per ton of vapor to be prepared, preferably 5-10 kilograms per hour per ton of vapor to be prepared, and more preferably 6-8 kilograms per hour per ton of vapor to be prepared. The above embodiment can obtain a very good combustion effect with respect to the boiler of 4 tons.

To obtain a desired flame temperature, in a more preferred embodiment, the vapor to be cracked is 1-10 wt. % of the produced vapor, and the use amount of the alcohol can be 4-12 kilograms per hour per ton of vapor to be prepared. With respect to the boiler of 4 tons, when the vapor to be cracked is 3-8 wt. % of the produced vapor, and preferably 4-6 wt. % of the produced vapor, and the use amount of the alcohol can be 5-10 kilograms per hour per ton of vapor to be prepared, and more preferably 6-8 kilograms per hour per ton of vapor to be prepared.

A schematic diagram of a specific embodiment of the direct combustion method of a hydrogen gas produced by vapor cracking provided in the invention is as shown in FIG. 1, and in this embodiment, the heat provided by the direct combustion of a hydrogen gas produced by vapor cracking is used for producing vapor. As shown in FIG. 1, a boiler 3 is provided at its upper left and right sides with a pipeline for external supplying vapor 5 and a pipeline for self-circulating vapor to be cracked 6 respectively, and vapor 4 transports vapor that is externally used and vapor that self-circulates to be cracked through the two pipelines, respectively. The vapor that self-circulates to be cracked enters the pressure container 1 from the inlet 7. The pressure container contains the vapor cracking catalyst provided in the invention, and catalytic cracking of the vapor is performed by the vapor cracking catalyst in the pressure container. The oxygen gas and the hydrogen gas produced by cracking and the vapor that is not cracked are transported from an outlet 8 through the pipeline to a combustion place 9, which herein is a nozzle placed in a furnace. An ignition agent 2 is also transported through another pipeline to the combustion place 9, where the ignition is performed. The number of the nozzles can be set to be one or more, e.g., two, three, four, etc., according to actual requirements.

The direct combustion method of a hydrogen gas produced by vapor cracking provided in the invention provides a large amount of heat, e.g., when the combustion of coal is performed in the prior arts, the temperature of the hearth is about 800° C., and it takes at least two hours to produce the vapor from cold water. The flame temperature in the direct combustion method of a hydrogen gas produced by vapor cracking provided in the invention is higher than 1000° C., generally around 1300° C. It spends only about 45 minutes producing the vapor from cold water.

The direct combustion method of a hydrogen gas obtained by vapor cracking provided in the invention can provide a large amount of heat very fast, and such heat is apparently not only provided mainly by the combustion of the hydrogen gas, or is explained as that the heat utilization rate of such combustion manner is especially high. Detailed descriptions are given by means of heat calculations as follows:

A boiler of 4 tons is taken as an example (less than 5% of the produced vapor is used to be cracked to produce the hydrogen gas).

In the prior arts, around 18-20 tons of coal of 5000 kilocalories per kilogram are required to undergo combustion for 24 hours a day, and the heat provided by the combustion of 18 tons of coal is as follows:

$$18 \times 1000 \times 5000 \text{ kilocalories} = 9 \times 10^7 \text{ kilocalories}$$

In the embodiment of the invention, about 700 kilograms of alcohol and the hydrogen gas produced by cracking about 4.8 tons of vapor (5% of the vapor of the 4-ton boiler is used as one to be cracked to produce the hydrogen gas: 4 tons per hour×24 hours×0.05=4.8 tons) are required to undergo combustion for one day. (Assuming that the vapor is wholly cracked into the hydrogen gas, the amount of the produced hydrogen gas is as follows: 4.8 tons×2÷18=0.53 ton)

The heat provided by the alcohol (the heat of combustion of alcohol is 1366.8 KJ/mol) is approximately as follows:

$$1366.8 \div (46 \times 4.2) \times 1000 \times 700 = 4.95 \times 10^6 \text{ kilocalories}$$

The heat provided by the hydrogen gas (the heat of combustion of the hydrogen gas is 284.8 KJ/mol) is as follows:

$$284.8 \div (2 \times 4.2) \times 1000 \times 0.53 \times 1000 = 1.8 \times 10^7 \text{ kilocalories}$$

Therefore, the total heat produced by the alcohol and the hydrogen gas is $2.3 \times 10^7$ kilocalories.

As can be seen, the theoretical heat produced by the combustion of the coal a day is about 4 times the theoretical heat produced by the direct combustion of a hydrogen gas produced by vapor cracking of the invention, but it is found in practical applications that the heats provided in these two manners both can be only used for providing 96 tons of vapor.

Thus, the actual calorific efficiency of the coal is very low, and the actual calorific efficiency of the direct combustion of a hydrogen gas produced by vapor cracking provided in the invention is very high.

Or, it is caused by the combustion of other substances, e.g., the combustion of the hydrogen ion that can provide such a large amount of heat according to the disclosure of the direct combustion of a hydrogen gas produced by vapor cracking of the invention. The energy level produced by the combustion of the molecule is generally about $10^4$ and the energy level of $10^7$ produced by the combustion of the plasma, and the energy level of $10^9$ produced by the combustion of the nucleus. Some scientists ever speculate the following phenomena: a strong gust of wind blows across the surface of the sea and after that a big fire suddenly occurs on several thousand meters of the surface of the sea. The cause of the big fire is that very high heat is produced by a violent friction between the strong gust of wind galloping at a speed of 200 kilometers per hour and the seawater, which separates the hydrogen atom and the oxygen atom in the water. The hydrogen atom is made to explode by means of the action of the charge in the strong wind, thereby forming a "sea of fire". As estimated by the scientists, the energy released from the "sea of fire" corresponds to the whole energy produced by the explosions of 200 hydrogen bombs. Perhaps, in the direct combustion method of a hydrogen gas produced by vapor cracking produced by the invention, a part of hydrogen atoms produced by cracking in the pressure container directly reach the combustion place to undergo the combustion before they form the hydrogen molecules. That's the reason why such a large amount of heat can be released.

With respect to the theoretical base that the direct combustion method of a hydrogen gas provided in the invention can release such a large amount of heat, it has not been completely clarified by the inventor of the invention up to the present day, and is being tested and verified through a plenty of experiments. The above-mentioned principle is only an exploration made by the inventor.

The direct combustion method of a hydrogen gas produced by vapor cracking provided in the invention is not only environmentally friendly and renewable, but also quite cost-effective with lower cost. A comparison of the direct combustion of the hydrogen gas with the combustion of the coal energy is shown as follows:

Accounting on cost:

| Energy from Coal | Energy from Direct Combustion of a Hydrogen Gas Obtained by Vapor Cracking |
| --- | --- |
| Calculating based on a boiler of 4 tons | Calculating based on a boiler of 4 tons |
| 18 tons of coal for 24 hours per day | 4.8 tons of vapor, 5 kilograms of catalyst, and 1000 kilograms of alcohol for 24 hours per day |
| 700 yuan RMB per ton (coal of 5000 kilocalories) 12,600 yuan RMB per day | 170 yuan RMB per kilogram (catalyst), 3500 yuan RMB per ton (alcohol) Approximately 5000 yuan RMB per day |

Example 1

The single substance iron, the single substance aluminum, the single substance platinum, the sodium chloride, the refined molybdenite and the refined manganese ore are respectively smashed. 0.3 kilogram of iron powders, 1 kilogram of aluminum powders, 0.7 kilogram of platinum powders, 1.5 kilograms of sodium chloride powders, 1.5 kilograms of molybdenite powders and 5 kilograms of manganese ore powders are homogenized by using water glass, placed in square molds, and molded under 3 atmospheres.

Example 2

The single substance iron, the single substance aluminum, the single substance platinum, the sodium chloride, the refined molybdenite and the refined manganese ore are respectively smashed. 0.7 kilogram of iron powders, 4 kilograms of aluminum powders, 0.1 kilogram of platinum powders, 1 kilogram of sodium chloride powders, 3 kilograms of molybdenite powders and 1 kilogram of manganese ore powders are homogenized by using water glass, placed in square molds, and molded under 8 atmospheres.

Example 3

The single substance iron, the single substance aluminum, the single substance platinum, the sodium chloride, the refined molybdenite and the refined manganese ore are respectively smashed. 1.5 kilograms of iron powders, 1.5 kilograms of aluminum powders, 2 kilograms of platinum powders, 0.1 kilogram of sodium chloride powders, 1 kilogram of molybdenite powders and 3.9 kilograms of manganese ore powders are homogenized using water glass, placed in square molds, and molded under 4 atmospheres.

Example 4

The single substance iron, the single substance aluminum, the single substance platinum, the sodium chloride, the refined molybdenite and the refined manganese ore are respectively smashed. 1 kilogram of iron powders, 2.5 kilograms of aluminum powders, 1 kilogram of platinum powders, 1 kilogram of sodium chloride powders, 1.5 kilograms of molybdenite powders and 3 kilograms of manganese ore powders are homogenized by using water glass, placed in square molds, and molded under 6 atmospheres.

Example 5

The single substance iron, the single substance aluminum, the single substance platinum, the sodium chloride, the refined molybdenite and the refined manganese ore are respectively smashed. 2 kilograms of iron powders, 6 kilograms of aluminum powders, 2 kilograms of platinum powders, 1 kilogram of sodium chloride powders, 4 kilograms of molybdenite powders and 5 kilograms of manganese ore powders are homogenized using water glass, placed in square molds, and molded under 7 atmospheres.

The vapor cracking catalysts prepared by Examples 1-5 are respectively tested.

Example 6

A boiler of 4 tons (equipped with two nozzles) is taken as an example. At the beginning, the vapor is produced by the combustion of the coal, about 5 wt. % of the produced vapor is used as one to undergo the catalytic cracking, about 5 kilograms of the vapor cracking catalyst prepared by Example 1 are filled in the pressure container, and the ignition agent is alcohol.

As shown in FIG. 1, the valve that controls the outlet is closed, and the valve that controls the inlet of the vapor is opened. When the pressure of the pressure container is made to be around 3 atmospheres, the valve that controls the inlet of the vapor is closed; and when the pressure of the pressure container is made to be about 6 atmospheres, the valve that controls the outlet is opened, the valve that controls the outflow of the alcohol is also opened, and the ignition is performed. The valve that controls the inlet of the vapor is opened. The use amount of the vapor cracking catalyst for one day is about 5 kilograms (1 kilogram per hour per ton of vapor to be cracked), and the use amount of the alcohol a day is 600 kilograms (6.2 kilograms per hour per ton of vapor to be prepared).

Example 7

A boiler of 4 tons (equipped with two nozzles) is taken as an example. At the beginning, the vapor is produced by the combustion of the coal, about 3 wt. % of the produced vapor is used as one to undergo the catalytic cracking, about 3.5 kilograms of the vapor cracking catalyst prepared by Example 2 are filled in the pressure container, and the ignition agent is alcohol.

As shown in FIG. 1, the valve that controls the outlet is closed, and the valve that controls the inlet of the vapor is opened. When the pressure of the pressure container is made to be about 2.5 atmospheres, the valve that controls the inlet of the vapor is closed; and when the pressure of the pressure container is made to be about 5 atmospheres, the valve that controls the outlet is opened, the valve that controls the outflow of the alcohol is also opened, and the ignition is performed. The valve that controls the inlet of the vapor is opened. The use amount of the vapor cracking catalyst a day is about 3.5 kilograms (1.2 kilograms per hour per ton of vapor to be cracked), and the use amount of the alcohol a day is 700 kilograms (7.3 kilograms per hour per ton of vapor to be prepared).

Example 8

A boiler of 0.5 ton (equipped with one nozzle) is taken as an example. At the beginning, the vapor is produced by the combustion of the coal, about 8 wt. % of the produced vapor is used as one to undergo the catalytic cracking, about 1 kilogram of the vapor cracking catalyst prepared by Example 3 is filled in the pressure container, and the ignition agent is alcohol.

As shown in FIG. 1, the valve that controls the outlet is closed, and the valve that controls the inlet of the vapor is opened. When the pressure of the pressure container is made to be about 1 atmosphere, the valve that controls the inlet of the vapor is closed; and when the pressure of the pressure container is made to be about 3 atmospheres, the valve that controls the outlet is opened, the valve that controls the outflow of the alcohol is opened, and the ignition is performed. The valve that controls the inlet of the vapor is opened. The use amount of the vapor cracking catalyst a day is about 1 kilogram (1 kilogram per hour per ton of vapor to be cracked), and the use amount of the alcohol a day is 50 kilograms (4.1 kilograms per hour per ton of vapor to be prepared).

Example 9

A boiler of 4 tons (equipped with two nozzles) is taken as an example. At the beginning, the vapor is produced by the combustion of the coal, about 6 wt. % of the produced vapor is used as one to undergo the catalytic cracking, about 5.5 kilograms of the vapor cracking catalyst prepared by Example 4 are filled in the pressure container, and the ignition agent is alcohol.

As shown in FIG. 1, the valve that controls the outlet is closed, and the valve that controls the inlet of the vapor is opened. When the pressure of the pressure container is made to be about 3 atmospheres, the valve that controls the inlet of the vapor is closed; and when the pressure of the pressure container is made to be about 6 atmospheres, the valve that controls the outlet is opened, the valve that controls the outflow of the alcohol is opened, and the ignition is performed. The valve that controls the inlet of the vapor is opened. The use amount of the vapor cracking catalyst a day is about 5.5 kilograms (0.95 kilogram per hour per ton of vapor to be cracked), and the use amount of the alcohol a day is 500 kilograms (5.2 kilograms per hour per ton of vapor to be prepared).

Example 10

A boiler of 10 tons (equipped with four nozzles) is taken as an example. At the beginning, the vapor is produced by the combustion of the coal, about 3.5 wt. % of the produced vapor is used as one to undergo the catalytic cracking, about 12 kilograms of the vapor cracking catalyst prepared by Example 5 are filled in the pressure container, and the ignition agent is alcohol.

As shown in FIG. 1, the valve that controls the outlet is closed, and the valve that controls the inlet of the vapor is opened. When the pressure of the pressure container is made to be about 4 atmospheres, the valve that controls the inlet of the vapor is closed; and when the pressure of the pressure container is made to be about 8 atmospheres, the valve that controls the outlet is opened, the valve that controls the outflow of the alcohol is opened, and the ignition is performed. The valve that controls the inlet of the vapor is opened. The use amount of the vapor cracking catalyst a day is about 12 kilograms (1.4 kilograms per hour per ton of vapor to be cracked), and the use amount of the alcohol a day is 1200 kilograms (5 kilograms per hour per ton of vapor to be prepared).

What is claimed is:

1. A vapor cracking catalyst, comprising: 1-15 wt. % iron, 10-40 wt. % aluminum, 10-30 wt. % molybdenite, 1-20 wt. % platinum, 10-50 wt. % manganese ore and 1-15 wt. % sodium chloride, based on total weight of said vapor cracking catalyst, wherein said platinum is a simple substance.

2. The vapor cracking catalyst according to claim 1, wherein said catalyst comprises 3-10 wt. % iron, 15-30 wt. % aluminum, 1-10 wt. % platinum, 1-10 wt. % sodium chloride, 10-20 wt. % molybdenite, and 10-40 wt. % manganese ore.

3. The vapor cracking catalyst according to claim 1 wherein said vapor cracking catalyst is powdered, porously granular or porously massive.

4. The vapor cracking catalyst according to claim 1, wherein the catalyst catalytically cracks water to produce hydrogen gas.

5. A preparation method comprising:
providing a vapor cracking catalyst, comprising: 1-15 wt. % iron, 10-40 wt. % aluminum, 10-30 wt. % molybdenite, 1-20 wt. % platinum, 10-50 wt. % manganese ore and 1-15 wt. % sodium chloride, based on total weight of said vapor cracking catalyst, wherein said platinum is a simple substance;
crushing said respective components of said catalyst;
homogenizing said respective components by using an adhesive not interacting with said respective components of said vapor cracking catalyst to provide a homogenized composition; and
molding the homogenized composition under pressure.

6. The preparation method according to claim 5, wherein said adhesive is selected from one or more of water glass, glutinous rice paste and paste, and said pressure is 2 to 8 atmospheres.

7. A direct combustion method of a hydrogen gas obtained by vapor cracking, the method comprising,
providing a vapor cracking catalyst, comprising: 1-15 wt. % iron, 10-40 wt. % aluminum, 10-30 wt. % molybdenite, 1-20 wt. % platinum, 10-50 wt. % manganese ore and 1-15 wt. % sodium chloride, based on total weight of said vapor cracking catalyst, wherein said platinum is a simple substance;
introducing vapor from an inlet of a pressure container containing the vapor cracking catalyst;
extracting a mixed gas containing a hydrogen gas and an oxygen gas obtained by cracking from an outlet of said pressure container; and
respectively introducing said mixed gas and an amount of an ignition agent to a combustion place or respectively introducing said mixed gas and a laser to said combustion place to ignite.

8. The direct combustion method of a hydrogen gas obtained by vapor cracking according to claim 7, wherein said mixed gas contains said vapor which is not cracked.

9. The direct combustion method of a hydrogen gas obtained by vapor cracking according to claim 8, comprising closing said outlet before introducing said vapor into said pressure container; closing said inlet when pressure in said pressure container reaches a first set pressure; opening said outlet when the pressure in said pressure container reaches a second set pressure; and igniting at said combustion place, and then opening said inlet.

10. The direct combustion method of a hydrogen gas obtained by vapor cracking according to claim 9 wherein said first set pressure is 1-4 atmospheres, and said second set pressure is 3-8 atmospheres.

11. The direct combustion method of a hydrogen gas obtained by vapor cracking according to claim 10, wherein said first set pressure is 2.5-4 atmospheres, and said second set pressure is 5-6 atmospheres.

12. The direct combustion method of a hydrogen gas obtained by vapor cracking according to claim 8, wherein the diameter of said inlet is less than the diameter of said outlet.

13. The direct combustion method of a hydrogen gas obtained by vapor cracking according to claim 8, wherein said ignition agent is alcohol, natural gas, gasoline or diesel oil.

14. The direct combustion method of a hydrogen gas obtained by vapor cracking according to claim 13, wherein when said ignition agent is liquid, a pipeline for draining said ignition agent and/or a pipeline for draining said mixed gas is equipped with a sheath for accommodating a cooling medium.

15. The direct combustion method of a hydrogen gas obtained by vapor cracking according to claim 7, wherein the use amount of the catalyst is 0.3-2.5 kilograms per hour per ton of vapor to be cracked.

16. The direct combustion method of a hydrogen gas obtained by vapor cracking according to claim 7, characterized in that-said direct combustion of a hydrogen gas is used for producing vapor, and said vapor to be cracked is a part of said produced vapor.

17. The direct combustion method of a hydrogen gas obtained by vapor cracking according to claim 16, wherein said vapor to be cracked is 1-10 wt. % of said produced vapor.

18. The direct combustion method of a hydrogen gas obtained by vapor cracking according to claim 16, wherein when said ignition agent is alcohol, the use amount of said alcohol is 4-12 kilograms per hour per ton of vapor to be prepared.

\* \* \* \* \*

UNITED STATES PATENT AND TRADEMARK OFFICE
CERTIFICATE OF CORRECTION

PATENT NO. : 10,006,362 B2
APPLICATION NO. : 14/431671
DATED : June 26, 2018
INVENTOR(S) : Huaichao Chen Page 1 of 1

It is certified that error appears in the above-identified patent and that said Letters Patent is hereby corrected as shown below:

On the Title Page

In item (30), in "Foreign Application Priority Data", in Column 1, Line 1, delete "2012 1 0364826" and insert --201210364826.7-- therefor In the Claims In Column 12, Line 40, in Claim 12, delete "claim 8," and insert --claim 7,-- therefor In Column 12, Line 44, in Claim 13, delete "claim 8," and insert --claim 7,-- therefor Signed and Sealed this
Seventh Day of May, 2019

Andrei Iancu
*Director of the United States Patent and Trademark Office*